US009855561B1

(12) United States Patent
Stahl et al.

(10) Patent No.: US 9,855,561 B1
(45) Date of Patent: Jan. 2, 2018

(54) APPARATUS FOR BREAKING UP CLUMPS OF GRANULAR MATERIAL IN A STORAGE BIN

(71) Applicants: Robert P. Stahl, Bridgewater, SD (US); Bob A. Waldner, Emery, SD (US)

(72) Inventors: Robert P. Stahl, Bridgewater, SD (US); Bob A. Waldner, Emery, SD (US)

( * ) Notice: Subject to any disclaimer, the term of this patent is extended or adjusted under 35 U.S.C. 154(b) by 547 days.

(21) Appl. No.: 14/566,397

(22) Filed: Dec. 10, 2014

Related U.S. Application Data (63) Continuation-in-part of application No. 12/885,968, filed on Sep. 20, 2010, now Pat. No. 8,920,100.

(51) Int. Cl.
| B02C 19/00 | (2006.01) |
| B01F 7/02 | (2006.01) |
| B01F 7/04 | (2006.01) |
| B01F 15/02 | (2006.01) |

(52) U.S. Cl.
CPC ............ B02C 19/00 (2013.01); B01F 7/04 (2013.01); B01F 15/0298 (2013.01); B01F 7/02 (2013.01)

(58) Field of Classification Search
CPC ........ B65G 65/46; B65D 88/68; B02C 19/00; B01F 7/04; B01F 7/02
USPC .................................................. 366/242, 243
See application file for complete search history.

(56) References Cited

U.S. PATENT DOCUMENTS

| 1,699,916 A * | 1/1929 | Platin ................... B01F 7/0065 366/302 |
| 2,864,655 A | 12/1958 | Caron |
| 3,536,210 A | 10/1970 | Dickinson |
| 3,559,957 A * | 2/1971 | Hurter ...................... B01J 19/18 261/84 |
| 3,602,485 A * | 8/1971 | Edgerton ............. C02F 1/5281 366/302 |
| 3,937,522 A | 2/1976 | Korn |
| 3,968,998 A | 7/1976 | Wolf |
| 4,083,475 A * | 4/1978 | Venner ................... B65D 88/68 222/198 |
| 4,183,706 A | 1/1980 | Jackson |
| 4,198,186 A | 4/1980 | Holdren |
| 4,313,706 A * | 2/1982 | Danford ................ B65D 88/66 222/233 |
| 4,431,597 A * | 2/1984 | Cramer ............... B01F 7/00741 261/93 |
| 4,464,259 A * | 8/1984 | Cramer ............... B01F 7/00741 210/170.08 |
| 4,499,614 A * | 2/1985 | Yeagley ................. A47K 11/02 210/149 |

(Continued)

Primary Examiner — Tony G Soohoo
(74) Attorney, Agent, or Firm — Jeffrey A. Proehl; Woods, Fuller, Shultz & Smith, P.C.

(57) ABSTRACT

A granular material stirring apparatus for breaking up clumps of a granular material in an interior of a storage bin comprises a base assembly for resting on a floor of the bin, an agitation rotor rotatably mounted on the base assembly, and a rotation device connected to the rotatable agitation rotor to cause the agitation rotor to rotate with respect to the base assembly. The agitation rotor may include a central member rotatable about a substantially horizontal axis and a plurality of stirrer members extending substantially radially outwardly from the central member to rotate about the substantially horizontal axis.

16 Claims, 10 Drawing Sheets

(56) References Cited

U.S. PATENT DOCUMENTS

| | | | |
|---|---|---|---|
| 4,566,801 A * | 1/1986 | Salzman | B01F 7/00733 366/264 |
| 4,572,675 A * | 2/1986 | Roberts | B01F 7/00741 366/263 |
| 4,581,182 A * | 4/1986 | Cramer | B01F 7/00741 210/220 |
| 4,693,394 A | 9/1987 | Martin, Jr. | |
| 4,831,748 A * | 5/1989 | del Valle | F26B 3/00 366/300 |
| 5,074,478 A | 12/1991 | Fujiwara | |
| 5,135,310 A * | 8/1992 | Nodus | B01F 7/042 241/292.1 |
| 5,145,254 A * | 9/1992 | Hovstadius | B01F 7/00733 366/286 |
| 5,310,121 A | 5/1994 | Nilson | |
| 5,361,711 A * | 11/1994 | Beyerl | A01G 13/0287 239/142 |
| 5,443,352 A | 8/1995 | Schuhmacher | |
| 5,458,414 A * | 10/1995 | Crump | B01F 3/1221 366/137 |
| 5,516,009 A * | 5/1996 | Kautz | B65D 88/68 222/238 |
| 5,527,373 A * | 6/1996 | Chareyre | B65D 88/68 435/290.1 |
| 5,618,107 A * | 4/1997 | Bartsch | B01F 7/22 366/249 |
| 5,769,590 A | 6/1998 | Weikel | |
| 5,975,447 A | 11/1999 | Brusseau | |
| 6,047,863 A * | 4/2000 | Kanzler | B65D 88/68 141/313 |
| 6,254,329 B1 | 7/2001 | Sukup | |
| 6,420,665 B1 | 7/2002 | Solignac | |
| 6,497,545 B1 | 12/2002 | Simrose | |
| 6,802,643 B1 * | 10/2004 | Cato, Jr. | B01F 7/00741 366/262 |
| 7,070,133 B1 | 7/2006 | Harlow | |
| 7,735,697 B2 | 6/2010 | Nordstrom | |
| 8,764,278 B2 * | 7/2014 | Fondelius | B01F 7/00733 366/270 |
| 8,920,100 B1 * | 12/2014 | Stahl | B65D 88/68 414/287 |
| 9,631,340 B2 * | 4/2017 | Zimmerman | E02F 3/962 |
| 9,687,798 B2 * | 6/2017 | Hoefken | B01F 7/06 |
| 2008/0131242 A1 | 6/2008 | Duffy | |
| 2010/0066089 A1 * | 3/2010 | Best | F03B 3/06 415/1 |
| 2010/0133174 A1 * | 6/2010 | Hoefken | B01F 7/0005 210/512.3 |
| 2010/0158652 A1 | 6/2010 | Anderson | |
| 2015/0259876 A1 * | 9/2015 | Zimmerman | E02F 3/962 239/214 |

* cited by examiner

APPARATUS FOR BREAKING UP CLUMPS OF GRANULAR MATERIAL IN A STORAGE BIN

REFERENCE TO RELATED APPLICATIONS

This application is a continuation-in-part of U.S. patent application Ser. No. 12/885,968, filed Sep. 20, 2010, which is hereby incorporated by reference in its entirety.

BACKGROUND

Field

The present disclosure relates to anti-clumping apparatus for bin-stored granular materials and more particularly pertains to a new apparatus for breaking up clumps of granular material in a storage bin to provide a safer and more convenient manner of dealing with clumps in bins without having to enter the bin to manually break up such clumps.

Description of the Prior Art

The emptying of granular material from a silo or storage bin can be difficult if the contents develop chunks or clumps of the granular material, as the clumps tend to block or clog or otherwise restrict the movement of the material to the outlet of the bin, which is typically accessed through a well or sump located at a substantially central location in the floor. Such clumps may be formed in many different ways depending upon the conditions present in the bin. For example, "bridging" of the granular material may occur when the grains of the granular material become stuck together on the top layers of the material in the bin, and when the material is being emptied out of the bin, the bridge of grain breaks into the clumps that migrate downwardly toward the well and the unloading mechanism. The clumps of material may be drawn into the well at the base of the bin and blocks the flow of material by gravity into the bin unloading apparatus. Even if the clumps do not reach the well, the clumps of material may accumulate above the well and block otherwise free flowing material from reaching the opening of the well.

SUMMARY

In view of the foregoing, the present disclosure describes a new apparatus for breaking up clumps of granular material in a storage bin which may be utilized for providing a safer and more convenient manner of dealing with clumps in bins without having to enter the bin to manually break up such clumps.

The present disclosure relates to a granular material stirring apparatus for breaking up clumps of a granular material in an interior of a storage bin. The apparatus may comprise a base assembly for resting on a floor of the bin, an agitation rotor rotatably mounted on the base assembly, and a rotation device connected to the rotatable agitation rotor to cause the agitation rotor to rotate with respect to the base assembly. The agitation rotor may include a central member rotatable about a substantially horizontal axis and a plurality of stirrer members extending substantially radially outwardly from the central member to rotate about the substantially horizontal axis.

In another aspect, the disclosure relates a grain storage handling system for a granular material. The system may comprise a storage bin defining an interior for storing a granular material. The bin may has a perimeter wall extending about the interior and a floor with an upper surface defining a bottom of the interior, as well as a well in communication with the interior for receiving the granular material from the interior. A removal auger is in communication with the well to remove granular material from the well to a location outside of the bin. A granular material stirring apparatus for breaking up clumps of a granular material in an interior of a storage bin may be positioned over the well of the bin. The apparatus may comprise a base assembly for resting on a floor of the bin, an agitation rotor rotatably mounted on the base assembly, and a rotation device connected to the rotatable agitation rotor to cause the agitation rotor to rotate with respect to the base assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 9 thereof, a new apparatus for breaking up clumps of granular material in a storage bin embodying the principles and concepts of the disclosed subject matter will be described.

Figure 1:
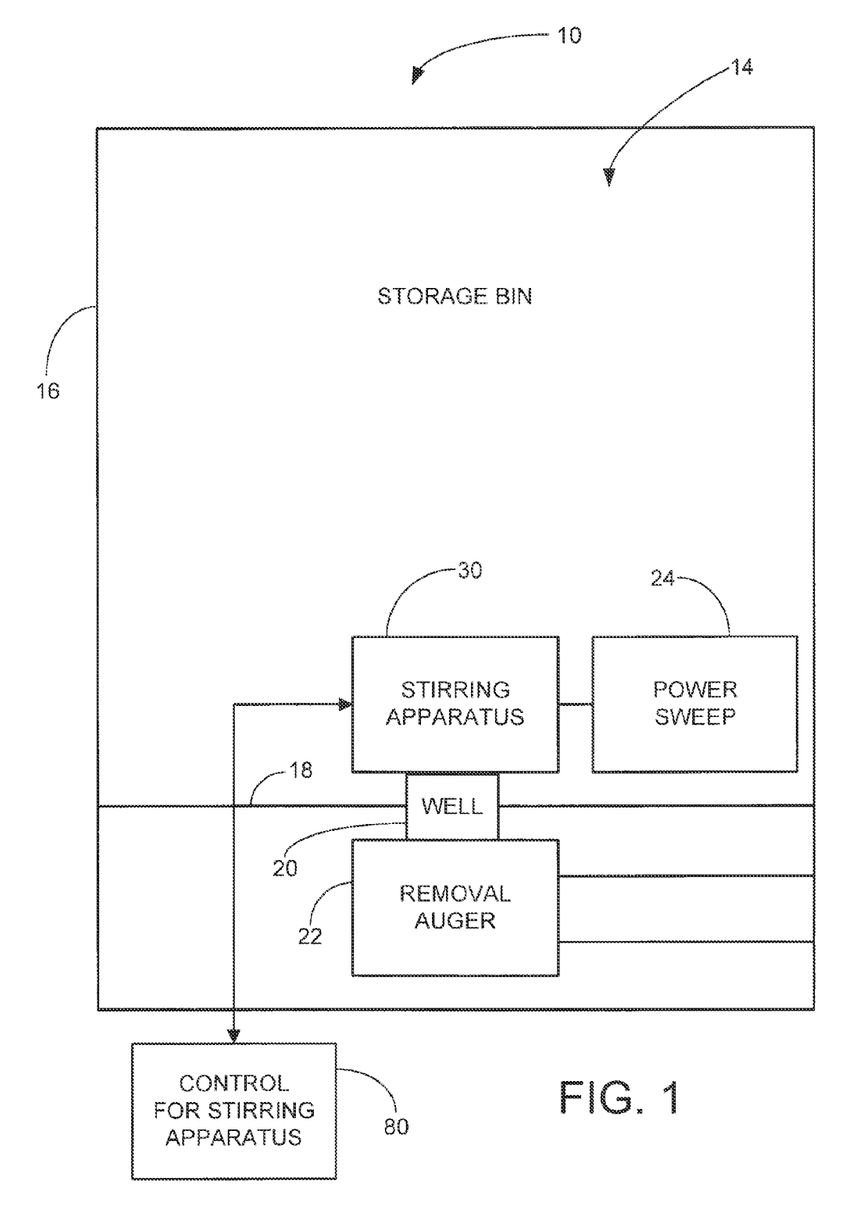
FIG. 1 is a schematic diagram of a granular material storage handling system employing an embodiment of the new apparatus for breaking up clumps of granular material in a storage bin according to the present disclosure.

In one aspect, the disclosure is directed to a granular material storage handling system 10 for holding and storing a granular material, such as a grain, although the application of the system is not so limited and may be utilized for storage of granular materials other than grain. The system 10 and its elements may be highly suitable for use with granular materials that in which grains or particles of the material tend to clump or become adhered together when stored, particularly where the clumps may interfere with the removal of the material from the storage space. Some of the most suitable granular materials are those that form localized clumps of the material in otherwise loose material, and the clumps may block an outlet through which the granular material is to be removed, and not in situations where the material becomes one monolithic mass in the storage space. Further, the system and the components thereof may be highly suitable for those granular materials that form clumps but the clumps are relatively easily broken up by mechanical contact with the clumps.

The granular material storage handling system 10 may comprise a storage bin 12 that defines an interior 14 for storing a granular material, such as a grain. The bin 12 may have a perimeter wall 61 that extends about the interior 14, and in many embodiments, the perimeter wall is substantially cylindrical in shape although this is not critical. The interior space may have a lower termination, and a floor 18 with an upper surface that defines a bottom of the interior. A discharge or outlet well 20 may be in communication with the interior 14 of the bin for receiving the granular material from the interior, and may be located on or in the floor 18 of the bin. The well 20 may extend into the floor, and in some embodiments, the well is substantially centrally located on the floor. By virtue of the location of the well 20 in the floor of the bin, material may flow by gravity from a location in the interior 14 of the bin into the well so that the well is filled with the material being stored in the interior.

The system 10 may further include a removal auger 22 that is in communication with the well 20 to remove granular material from the well to a location outside of the bin 12. The removal auger 22 may be at least partially positioned below the floor of the bin, and in many cases is completely located below the floor at a level that is generally the same as the well.

In some systems 10, a power sweep assembly 24 may be utilized that is positioned in the interior 14 of the bin 12 for moving the granular material in the interior. The sweep assembly 24 may be oriented to move granular material toward the location of the well 20 in the floor, and thus in many cases will be configured to move the material toward a substantially central location on the floor. The sweep assembly 24 may be positioned along a portion of the floor 18 of the bin 12 to move material that is generally positioned just above the floor in the interior. The assembly 24 may be pivotable about a substantially central location in the interior 14, and may be pivotable about the well 20. The sweep assembly 24 may extend radially outward from the well 20 toward the perimeter wall of the bin. The sweep assembly 24 may include a central mount 26 which may be pivotable with respect to the floor. In some embodiments, the central mount 26 may comprise a gearbox of the sweep assembly for driving an auger of the assembly that extends radially outward from the substantially central location of the bin. The auger may have an outboard end that is positioned toward the perimeter wall 16 of the bin and an inboard end that is positioned toward the well. The inboard end of the auger may be connected to the gearbox of the central mount 26. In those embodiments of the system including the sweep assembly, the central mount may comprise virtually any past of the assembly 24 that moves or rotates with the auger about the well.

A significant aspect of the system 10 is a granular material stirring apparatus 30 that is configured to actively break up clumps of a granular material in the interior of the storage bin. Rather than simply relying upon passive contact between the apparatus and the clumps of material, the stirring apparatus strikes and exerts pressure against the clumps within the mass of otherwise free granular material. The stirring apparatus 30 may break up clumps in a flow path of the granular material to the well 20, and the flow path typically extends in an upward direction from the well into the interior of the bin. The stirring apparatus 30 is thus typically positioned in the interior 14 of the bin. In those systems 10 that include a sweep assembly 24, the stirring apparatus 30 may be mounted on the sweep assembly, and the stirring apparatus 30 may be connected to the central mount of the sweep assembly to pivot with the central mount and the sweep assembly.

In greater detail, embodiments of the stirring apparatus 30 may include a base assembly 32 for positioning toward, and in some cases resting on, the floor of the bin. The base assembly 32 may comprise a base frame 34 for contacting the floor 18 of the bin. The base frame 34 may include a plurality of legs 36 for contacting the floor, and in some embodiments of the frame, the plurality of legs comprises two pairs of legs for a total of four legs, although more ort fewer legs may be employed. Each pair of legs may have an inverted V configuration such that each pair of legs has an upper apex and a pair of lower ends, and a bushing or bearing may be formed in the pair of legs at the apex thereof for a purpose to be described in this disclosure.

The base assembly 32 may further comprise a motor support 38 that is mounted on the base frame 34, and may be mounted on one of the pairs of legs 36. The motor support 38 may extend outwardly from the base frame 34, and may be generally horizontally oriented, although this is not critical. The base assembly 32 may also comprise a support strut 40 that is mounted on the motor support 38 for contacting the floor, and may extend downwardly from the motor support.

In some embodiments of the stirring apparatus 30, such as those embodiments in which the apparatus 30 is to move with the sweep assembly 24, the base assembly 32 may comprise a skid assembly 42 for resting on the floor 18 to permit the base frame 34 to slide across the floor. The skid assembly 42 may include at least one primary skid plate 44 that is mounted on the base frame 34 to allow the base frame to slide on the floor of the bin. The at least one primary skid plate 44 may be mounted on at least one of the legs, and may be mounted on a pair of the legs. A pair of primary skid plates 44 may be employed with one of the skid plates being mounted on each pair of the legs. The skid assembly 42 may also comprise a secondary skid plate 46 that is mounted on the support strut 40, and may be located on a lower end of the support strut.

The stirring apparatus 30 may further include an agitation rotor 50 that is rotatably mounted on the base assembly 32. In general, the agitation rotor 50 is configured to move through the mass of loose granular material in the interior of the storage bin and contact any clumps of the material that are moving toward the well with the non-clumped material. Contact between the rotor 50 and the clumps is typically enough to break the clumps apart to the extent that the clumps no longer threaten to create a blockage for the loose material moving toward the well. In the illustrative embodiment, the agitation rotor 50 may comprise a central member 52 that is mounted on and extends between the legs, and may be journalled in the journals of the pairs of legs. The central member may comprise a shaft which may be substantially horizontally oriented so as to rotate about a substantially horizontal axis. The rotor 50 may further comprise a plurality of stirrer members 54 mounted on the central member 52 to rotate with the central member when the central member rotates. The stirrer members 54 may radiate outwardly from the central member at different radial positions on the central member. Each of the stirrer members 54 may include a first portion 56 extending in a first direction from the central member and a second portion 58 extending in a second direction from the central member that may be opposite to the first direction. A first stirrer member 60 may extend along a first longitudinal axis and a second stirrer member 62 may extend along a second longitudinal axis, with the first and second longitudinal axis being skewed with respect to each other. In some embodiments, a third stirrer member 62 may be utilized which extends along a third longitudinal axis that is different and skewed with respect to the first and second longitudinal axes. In the illustrative embodiment, each of the longitudinal axes is rotated approximately 60 degrees from the other longitudinal axes. In some embodiments, the stirrer members may comprise a rod-shaped member, and may also include a rib that is secured to the at least a portion of the length of the rod that has a relatively thinner cross sectional area to facilitate slicing grains of the granular material of the clumps apart from each other.

The stirring apparatus 30 may further include a rotation device 64 connected to the rotatable agitation rotor 52 to cause the agitation rotor to rotate with respect to the base assembly 32. The rotation device 52 may be connected to the central member of the agitation rotor to rotate the central member, and the connection may be accomplished using any suitable structure and may include, for example, a universal joint coupling. To generate sufficient torque to move the stirrer members through the granular material, and any clumps thereof, a reduction gearbox may be employed between the shaft of the motor and the rotor. In the illustrative embodiments of the system, the rotation device 64 comprises a motor that is electrically powered, although other types of devices using different power sources may be utilized. The motor may be mounted on the motor support 38 and may also be supported by the support strut 40. In some illustrative embodiments, the rotation device may rotate the rotor at a speed in the range of approximately three revolutions per minute to approximately seven revolutions per minute, although faster or slower speeds may less preferably be utilized.

Figure 2:
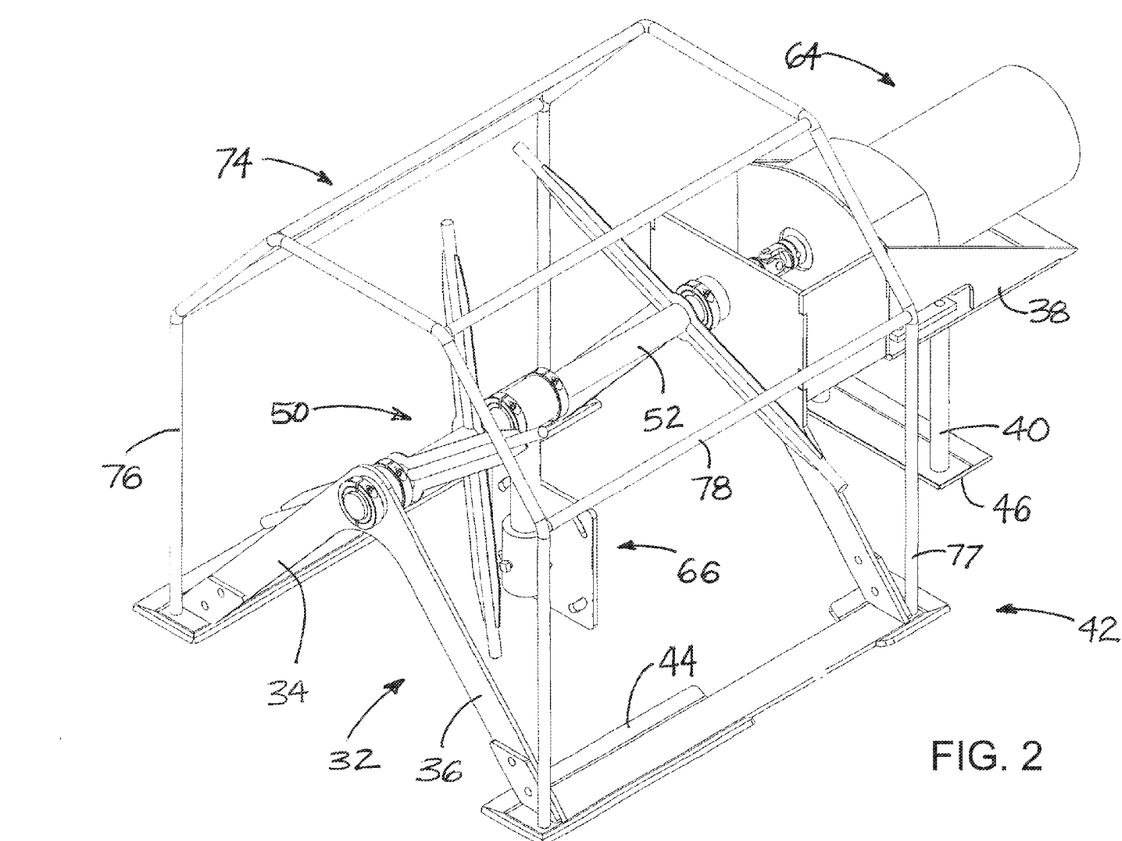
FIG. 2 is a schematic perspective view of the stirring apparatus of the system, according to an illustrative embodiment.
Figure 3:
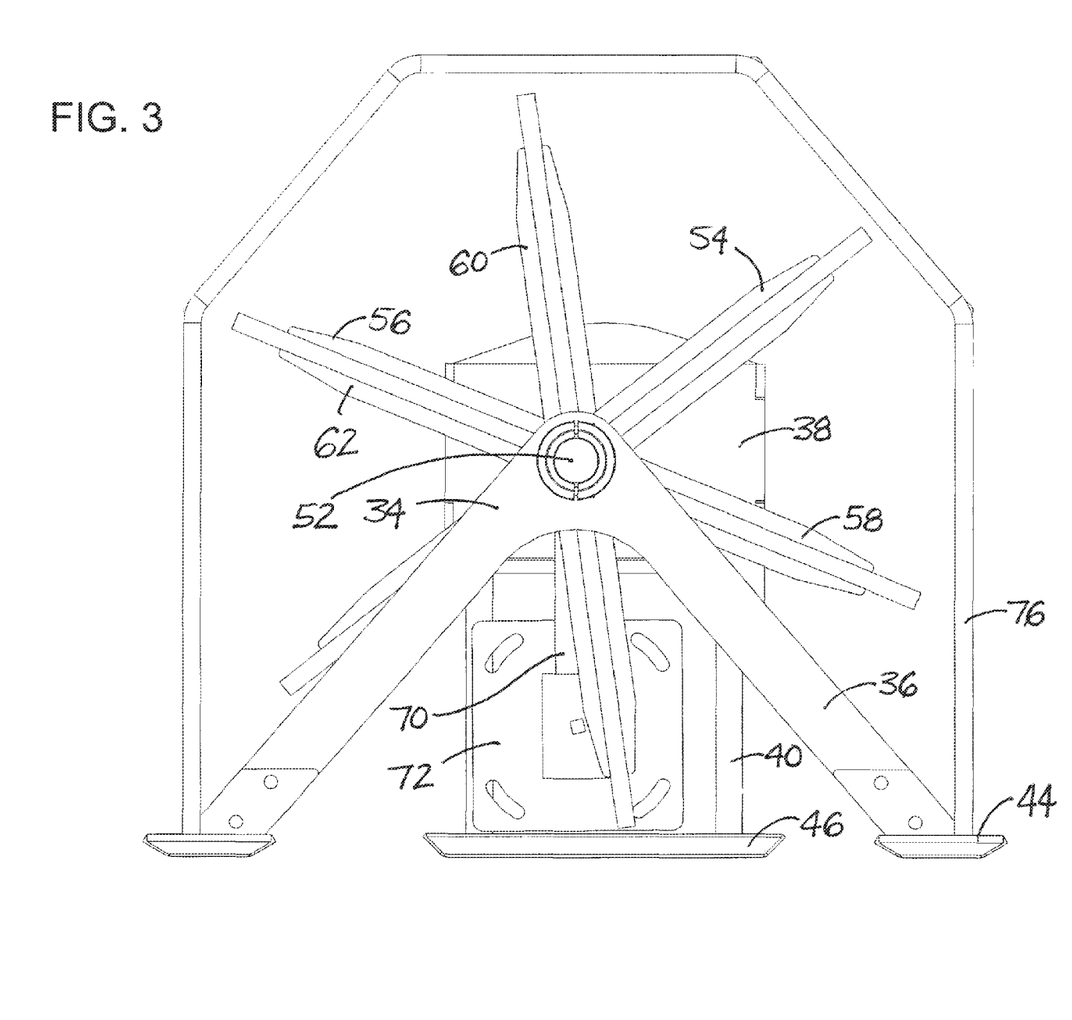
FIG. 3 is a schematic end view of the stirring apparatus, according to an illustrative embodiment.
Figure 4:
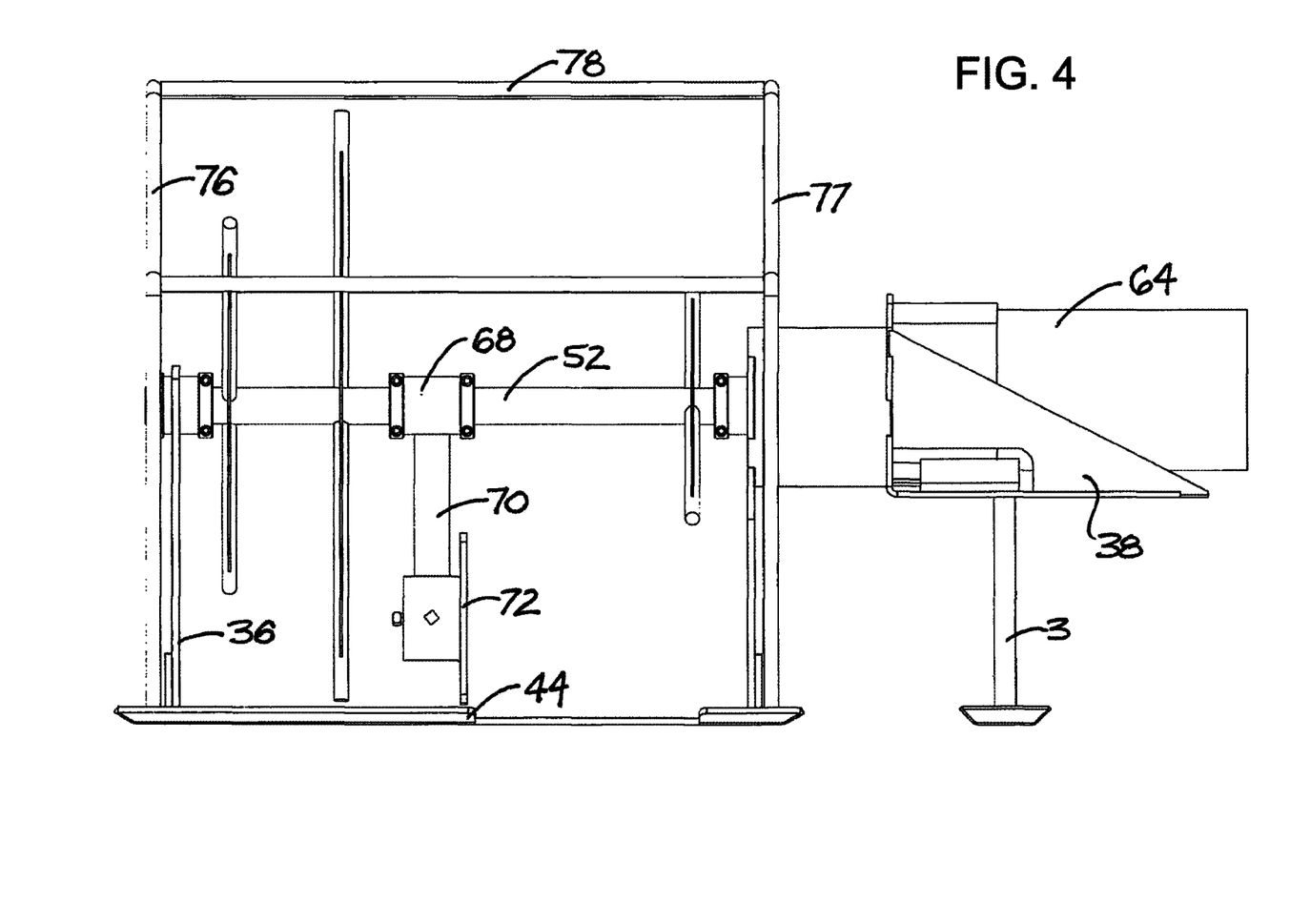
FIG. 4 is a schematic side view of the stirring apparatus, according to an illustrative embodiment.
Figure 5:
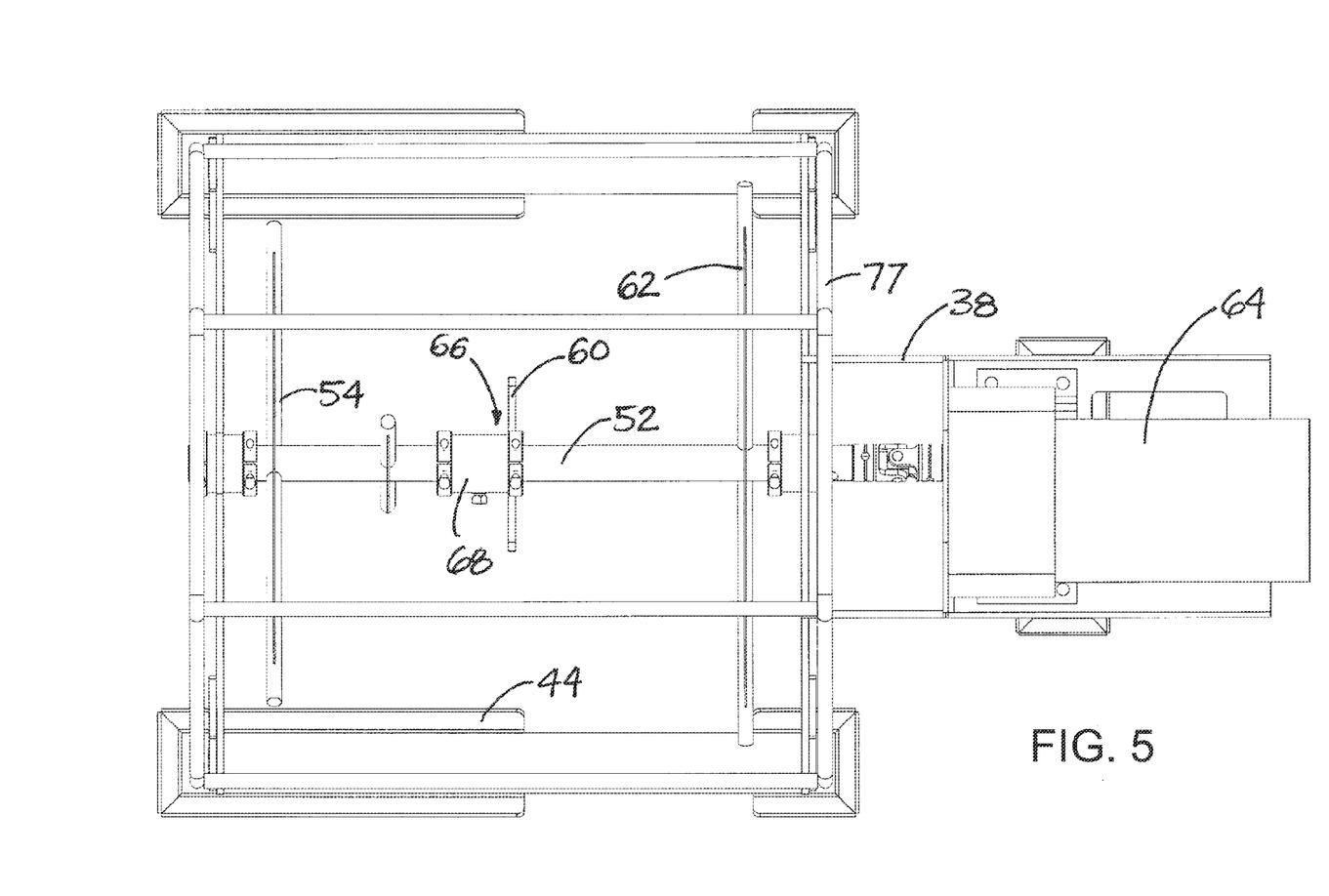
FIG. 5 is a schematic top view of the stirring apparatus, according to an illustrative embodiment.
Figure 6:
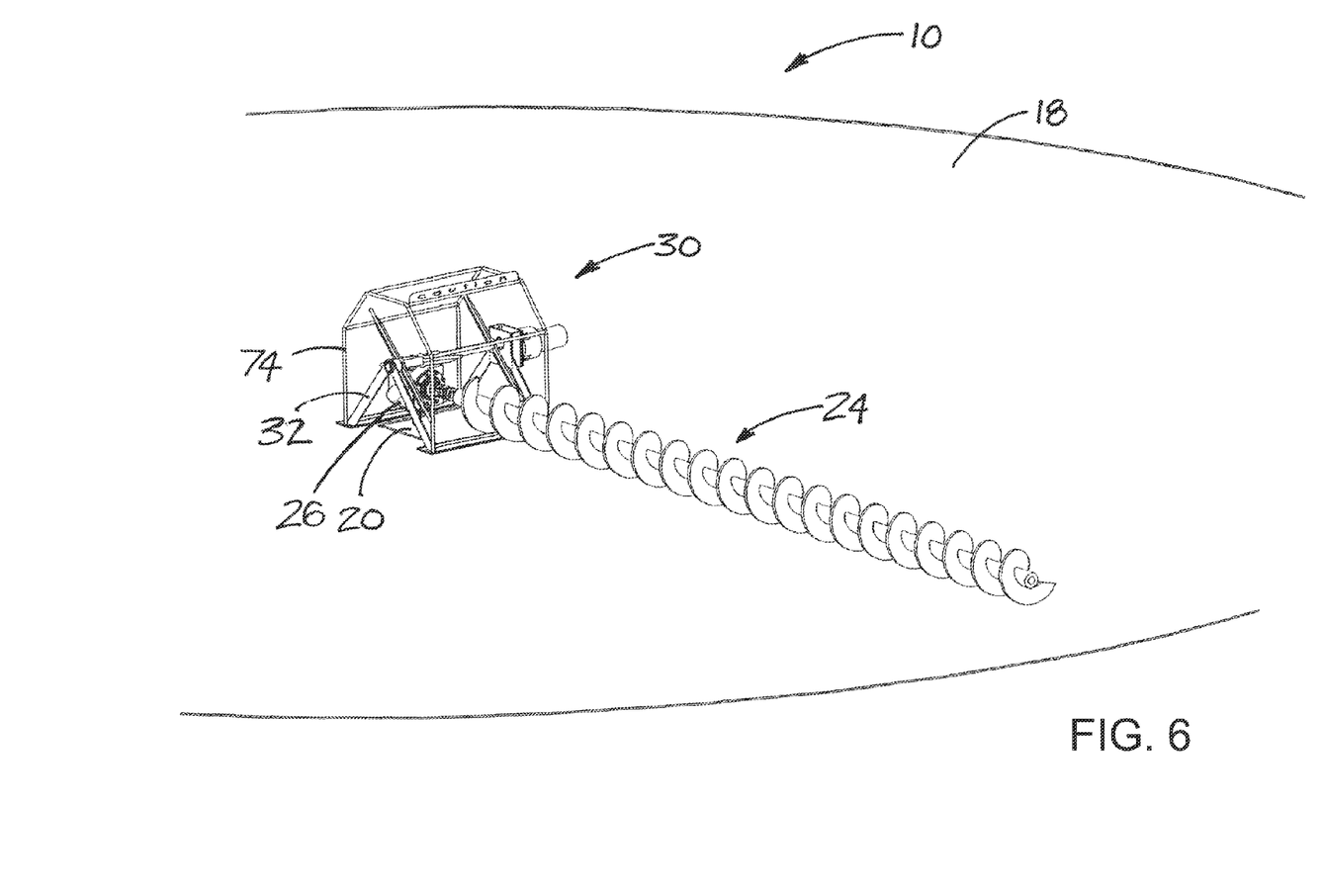
FIG. 6 is a schematic perspective view of the stirring apparatus on a floor adjacent to a well of a storage bin, according to an illustrative embodiment.
Figure 7:
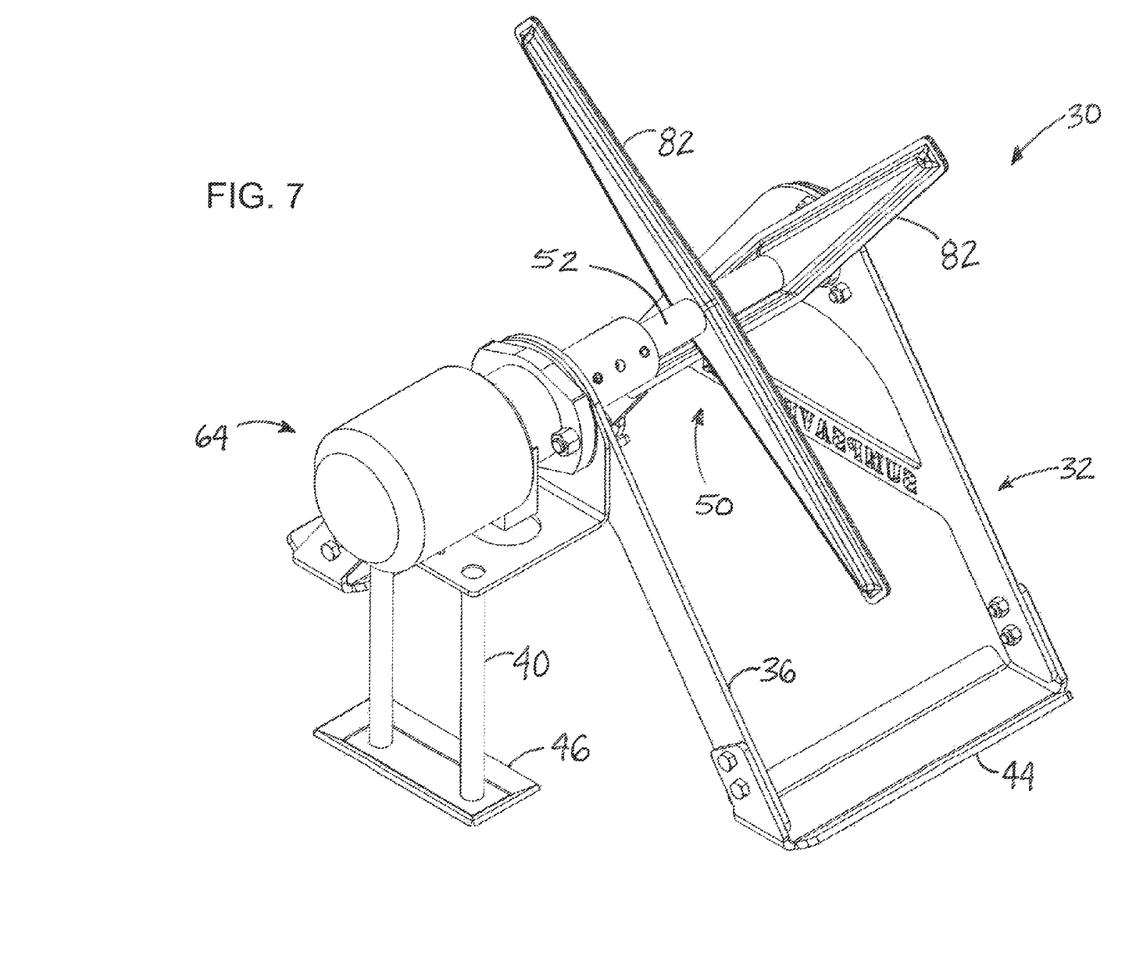
FIG. 7 is a schematic perspective view of another embodiment of a stirring apparatus with an optional stirrer member configuration.
Figure 8:
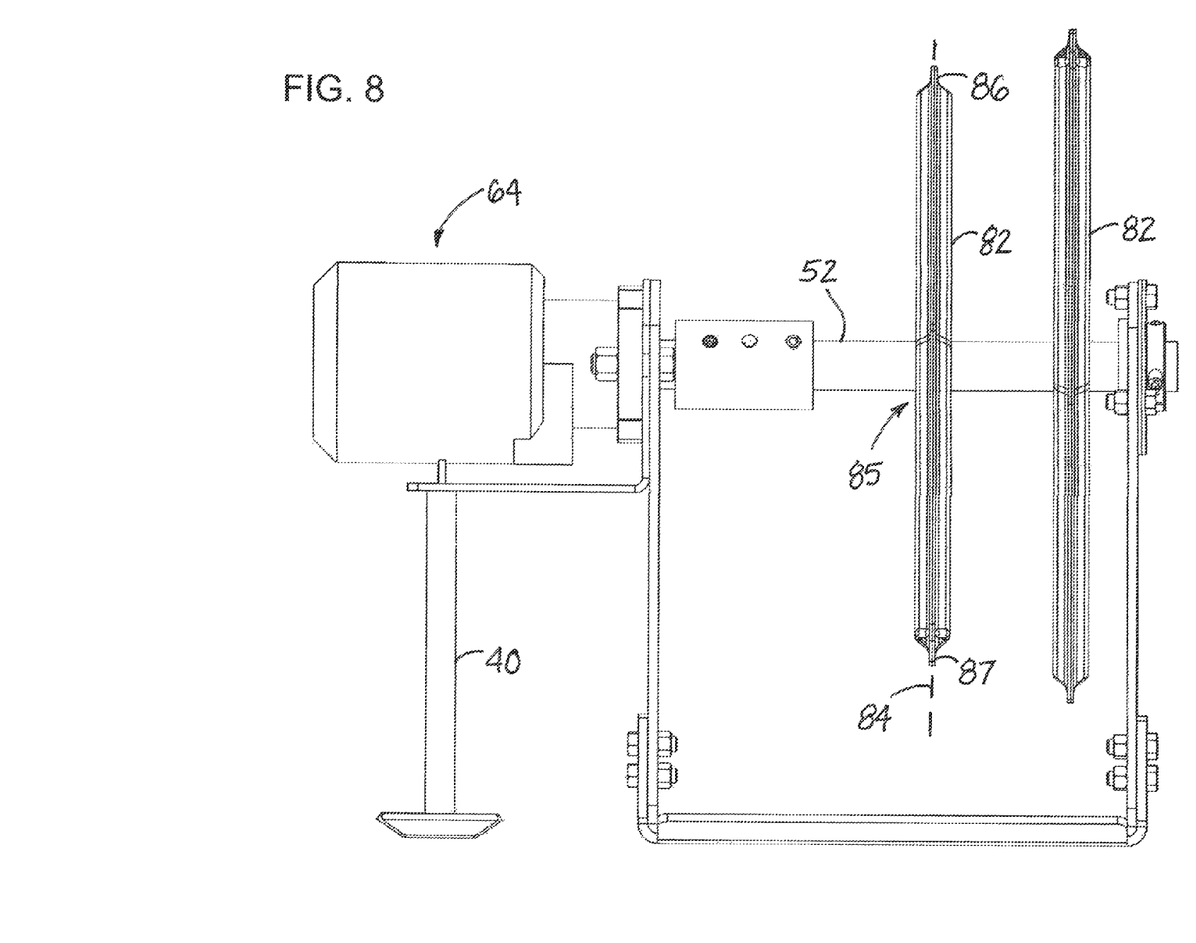
FIG. 8 is a schematic side view of the stirring apparatus embodiment shown in FIG. 7.

For embodiments in which the stirring apparatus 30 is to be employed with a power sweep assembly 24, the stirring apparatus may interfere with the movement of the sweep assembly if the sweep assembly is stationary or movement is not possible. In such implementations, the stirring apparatus 30 may further include a linking structure 66 for linking the stirring apparatus to the sweep assembly in a manner that causes the stirring apparatus to move as the sweep assembly moves. For example, in the illustrative embodiment, as the sweep assembly, and the gearbox of the sweep assembly, moves with respect to the well 20 in the floor, the linking structure causes the stirring apparatus to move in a manner that does not interfere with the movement of the sweep assembly. The movement of the sweep assembly may be a rotation, and the stirring assembly may also be rotated in movement that corresponds to the movement of the sweep assembly by the linking structure 66. The linking structure 66 may be configured to be connected to the central mount 26 of the sweep assembly, although other link mounting points may be utilized.

The linking structure 66 of the stirring apparatus 30 may be mounted on the rotor 50 of the apparatus 30, and may be mounted on the central member 52 of the rotor. The rotor 50 and the linking structure 66 may be rotatable independently of each other. In the illustrative embodiment, the linking structure may comprise a bushing element 68 for receiving the central member 52 of the rotor 50 in a manner which allows the bushing element to remain relatively stationary as the central member is rotated by the rotation device. The linking structure may also include a linking element 70 that is mounted on the bushing element, and may depend downwardly from the central member. The linking structure may also include a mounting element 72 that is mounted on the linking element 70 such as a lower end of the linking element when an upper end of the linking element is attached to the bushing element. The mounting element 72 may be configured for attaching to an element or feature of the sweep assembly, such as the gearbox of the sweep assembly, that rotates with the auger of the sweep assembly so that the stirring apparatus moves in a manner that corresponds to the movement of the sweep assembly.

In some embodiments of the system 10, a safety cage 74 may be utilized for surrounding all or a portion of the stirring apparatus 30 to help prevent inadvertent or accidental contact between a person or a hard object with the stirring apparatus, and most particularly the stirrer embers of the rotor 50. The cage 74 may also act as a passive means for breaking up clumps before the clumps reach the stirring apparatus, although such a function is in addition to the primary clump breaking of the stirring apparatus. The safety cage 74 may be mounted on the base assembly 32 to move with the base frame 34. In the illustrative embodiments, the safety cage 74 may be mounted on the skid assembly 42 of the base assembly. In greater detail, an illustrative embodiment of the safety cage 74 may include a pair of side frames 76, 77 that are positioned in a spaced relationship, and each of the side frames may lie in a plane such that the planes of the side frames are oriented substantially parallel to each other. Each of the side frames 76, 77 may extend in a plane that is oriented substantially parallel to a plane of one of the pairs of legs of the base frame. Each of the side frames 76, 77 may have a lower portion that is mounted on the skid assembly 42 so that the cage rides on the skid plate and may be connected to the stirring apparatus through the common connection to the skid plate, although other means of connection to the stirring apparatus may be utilized. Through the common connection to the primary skid plates 44, the cage 74 may be made to move with the stirring apparatus if the stirring apparatus moves with the sweep assembly. The cage 74 may further include a plurality of cross members 78 extending between the side frames 76, 77 to connect the side frames together. The side frames position the cross members so that the parts of the moving rotor do not contact the cross member, while holding large objects away from the moving rotor parts.

It will be appreciated from the above that the stirring apparatus functions to actively contact and break up clumps of the granular material as a flow of the granular material moves downwardly in the bin toward the well which is receiving material as the material is moved out of the well by the removal auger. The location of the stirring apparatus above the well positions the stirring apparatus for intercepting and breaking up any clumps prior to reaching the well, where the overall flow of the material might be stopped by clumps that end up positioned above or inside the well where the auger of the removal auger is unable to contact the material of the clump. Thus, only clumps or agglomerations of the material that pose a risk of interfering with the flow of material into the intake of the well are engaged. Further, the stirrer apparatus 30 may be relatively compact so as to not occupy a significant space within the interior of the bin, as well as being positioned relatively close to and above the well. The apparatus 30 is also relatively light weight such that is can be supported on a reticulated floor which is raised above a lower floor to permit air to flow through the reticulated floor.

A control 80 may be utilized for controlling the operation of the stirring apparatus 30 so that the apparatus 30 may be operated intermittently as needed, substantially continuously as the bin is being emptied by the removal auger, and the control 80 may include a timer for operation so that the time that the apparatus 30 may be operated may be limited in length so that the apparatus does not operate beyond a desirable time period. The control 80 may also allow the user to operate the motor in opposite first and second operational directions so that, should the rotation of the rotor become blocked by a clump that is especially difficult to break up, or other obstruction.

Another embodiment to the stirring apparatus, such as is shown in FIGS. 7 through 10, may include a stirrer member 82 that is elongated with a longitudinal axis 84 and opposite ends 86, 87, with a length of the stirrer member being measured between the opposite ends. The stirrer member may have a center 85 that is located approximately halfway between the opposite ends 86, 87, and the stirrer member may have a width that is measured in a direction perpendicular to the longitudinal axis 84. In some embodiments, the width of the stirrer member at the center 85 is greater than the width of the stirrer member at either of the ends 86, 87 of the stirrer member in order to provide relatively greater strength toward the center of the stirrer member than at the ends. The width of the stirrer member 82 may vary substantially continuously from the center to each of the ends, and may taper smaller from the center to the end.

Figure 9:
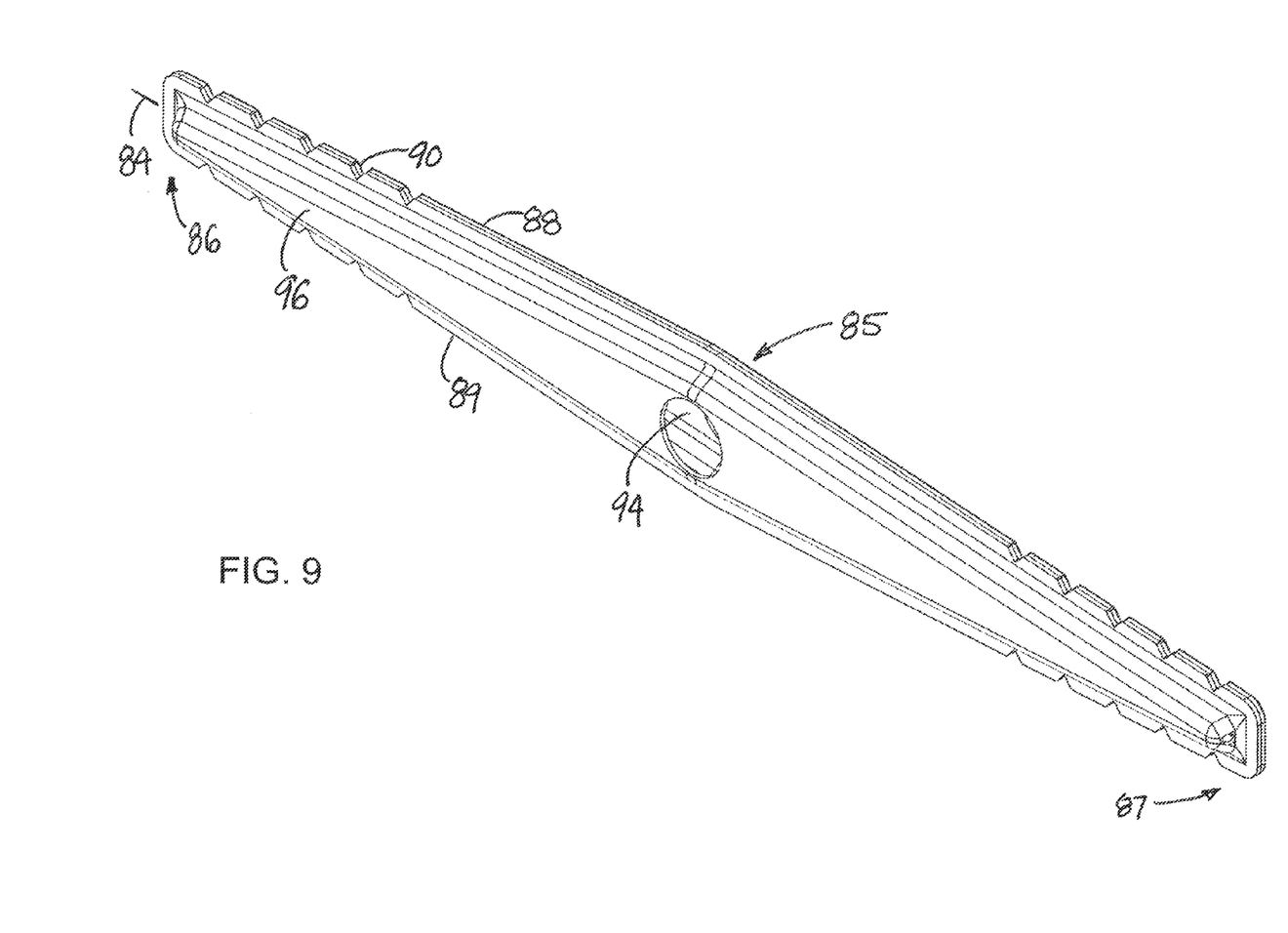
FIG. 9 is a schematic perspective view of an optional configuration of a stirrer member.
Figure 10:
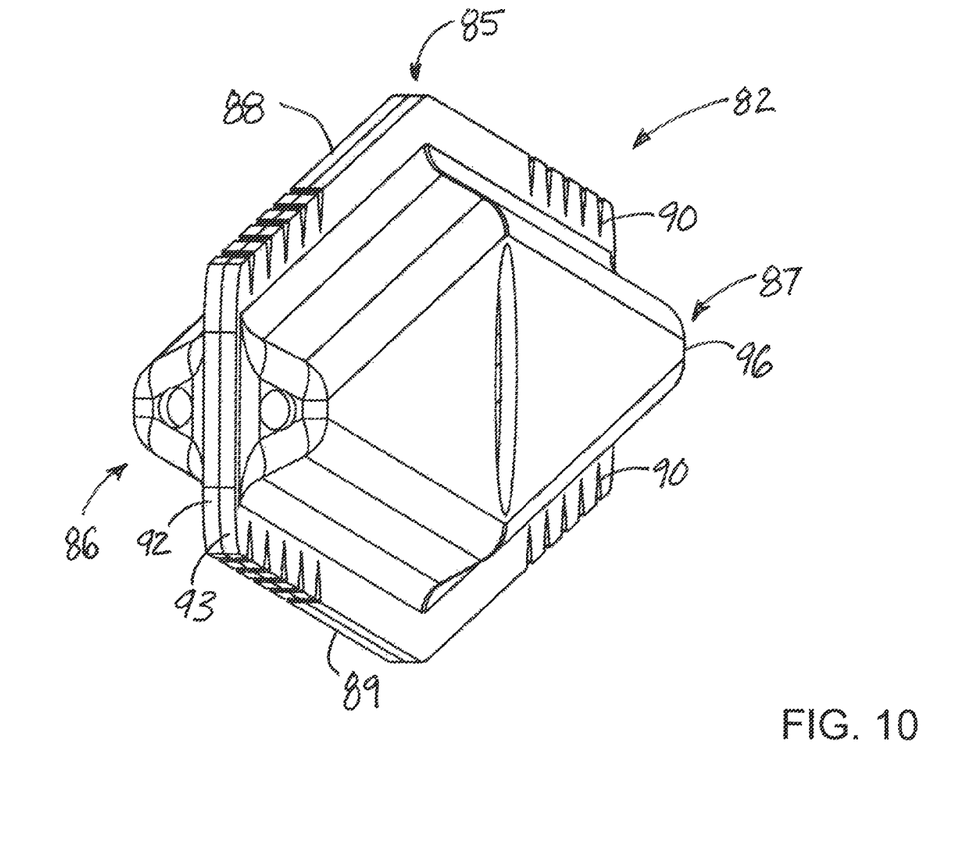
FIG. 10 is a schematic end perspective view of the stirrer member configuration of FIG. 9.

At least one of the stirrer members 82 may have opposite side edges 88, 89 that extend between the opposite ends and at least one notch 90 may be formed in at least one of the side edges (see FIGS. 9 and 10). The at least one notch may comprise a plurality of the notches that are formed in each of the opposite edges 88, 89 of the stirrer member, and the notches may be located in distal end sections of each of the first and second portions of the stirrer member, although the notches may be located at other locations along the length of the member 82. In some illustrative embodiments, the notches may have a substantially V-shape, although other notch configurations may be utilized. Use of the notches 90 may facilitate breaking up of clumps or aggregations of the granular material because the notches may tend to resist the clumps simply being pushed around by the stirrer member due to the clumps being able to slide along the side edges of the member 82. The notches tend to bite into the agglomerations of granular material and resist the sliding along the side edges.

In some embodiments, the stirrer member 82 is formed of a pair of plates 92, 93, with inward surfaces of the plates being positioned toward or against each other. Each of the plates may have a channel 94 that is formed in the inward surface that may extend toward the ends 86, 87 of the stirrer member, although the channel may terminate before the ends such the ends of the channel are closed. In embodiments where the plates are formed of a substantially uniformly thick material, a ridge 96 may be formed on the outward surface of the plate. The channels of the plates may be positioned in substantial opposition to each other, which may form a tubular and substantially hollow cavity in between the plates along at least a portion of the length of the stirrer member. The channel 94 may have a width that is measured perpendicular to the longitudinal axis 84 of the stirrer member, and in some embodiments the width of the channel is relatively larger at the center 85 of the stirrer member than the width of the channel toward the ends 86, 87 of the stirrer member. The channels formed in the plates 92, 93 tend to provide significant resistance to bending of member in a plane containing both the longitudinal axis and the axis of rotation of the member 82.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A granular material stirring apparatus for breaking up clumps of a granular material in an interior of a storage bin, the apparatus comprising:
   a base assembly for resting on a floor of the bin;
   an agitation rotor rotatably mounted on the base assembly; and
   a rotation device connected to the rotatable agitation rotor to cause the agitation rotor to rotate with respect to the base assembly;
   wherein the agitation rotor includes a central member rotatable about a substantially horizontal axis and a plurality of stirrer members extending substantially radially outwardly from the central member to rotate about the substantially horizontal axis without contact the floor on which the base assembly rests;

wherein at least one of the stirrer members is elongated with a longitudinal axis and opposite ends, the at least one stirrer member having a width measured in a direction perpendicular to the longitudinal axis, the width of the at least one stirrer member varying continuously between the ends of the member; and wherein at least a portion of a length of the at least one stirrer member between the ends is hollow.

2. The apparatus of claim 1 wherein the at least one stirrer member has a center approximately halfway between the opposite ends, and the width of the stirrer member at the center being greater than a width of the stirrer member at either ends of the stirrer member.

3. The apparatus of claim 2 wherein the width of the at least one stirrer member tapers smaller from the center to the ends.

4. The apparatus of claim 1 wherein the at least one stirrer member has opposite side edges extending between the opposite ends, and at least one notch is formed in at least one of the side edges.

5. The apparatus of claim 1 wherein the stirrer member is formed of a pair of plates joined together, each of the plates having an inward surface with a channel formed therein, the channels of the plates being positioned in opposition to each other to form the hollow.

6. The apparatus of claim 5 wherein the channel has a width measured perpendicular to the longitudinal axis of the stirrer member, the width of the channel being larger at the center of the stirrer member than toward the ends of the stirrer member.

7. The apparatus of claim 1 wherein the at least one stirrer member has opposite side edges extending between the opposite ends, and a plurality of notches are formed in each of the side edges of the stirrer member.

8. The apparatus of claim 1 additionally comprising a cage surrounding the rotor.

9. A granular material stirring apparatus for breaking up clumps of a granular material in an interior of a storage bin, the apparatus comprising:

a base assembly for resting on a floor of the bin;

an agitation rotor rotatably mounted on the base assembly; and a rotation device connected to the rotatable agitation rotor to cause the agitation rotor to rotate with respect to the base assembly;

wherein the agitation rotor includes a central member rotatable about a substantially horizontal axis and a plurality of stirrer members extending substantially radially outwardly from the central member to rotate about the substantially horizontal axis without contact the floor on which the base assembly rests;

wherein at least one of the stirrer members is elongated with a longitudinal axis and opposite ends, the at least one stirrer member having a width measured in a direction perpendicular to the longitudinal axis, the width of the at least one stirrer member varying continuously between the ends of the member; and wherein the at least one stirrer member has opposite side edges extending between the opposite ends, and at least one notch is formed in at least one of the side edges.

10. A granular material stirring apparatus for breaking up clumps of a granular material in an interior of a storage bin, the apparatus comprising:

a base assembly for resting on a floor of the bin;

an agitation rotor rotatably mounted on the base assembly; and a rotation device connected to the rotatable agitation rotor to cause the agitation rotor to rotate with respect to the base assembly;

wherein the agitation rotor includes a central member rotatable about a substantially horizontal axis and a plurality of stirrer members extending substantially radially outwardly from the central member to rotate about the substantially horizontal axis without contact the floor on which the base assembly rests;

wherein at least one of the stirrer members has opposite side edges extending between the opposite ends, and a plurality of notches are formed in each of the side edges of the at least one stirrer member.

11. The apparatus of claim 10 wherein the at least one stirrer member has a center approximately halfway between the opposite ends, and the width of the stirrer member at the center being greater than a width of the stirrer member at either ends of the stirrer member.

12. The apparatus of claim 11 wherein the width of the at least one stirrer member tapers smaller from the center to the ends.

13. The apparatus of claim 10 wherein at least a portion of a length of the at least one stirrer member between the ends is hollow.

14. The apparatus of claim 13 wherein the stirrer member is formed of a pair of plates joined together, each of the plates having an inward surface with a channel formed therein, the channels of the plates being positioned in opposition to each other to form the hollow.

15. The apparatus of claim 14 wherein the channel has a width measured perpendicular to the longitudinal axis of the stirrer member, the width of the channel being larger at the center of the stirrer member than toward the ends of the stirrer member.

16. The apparatus of claim 10 wherein at least one of the stirrer members is elongated with a longitudinal axis and opposite ends, the at least one stirrer member having a width measured in a direction perpendicular to the longitudinal axis, the width of the at least one stirrer member varying continuously between the ends of the member.

* * * * *